Nov. 6, 1956　　　R. E. SCHWARTZ　　　2,769,741
METHOD OF MAKING A FIBROUS ARTICLE
Filed Jan. 19, 1953　　　2 Sheets-Sheet 1
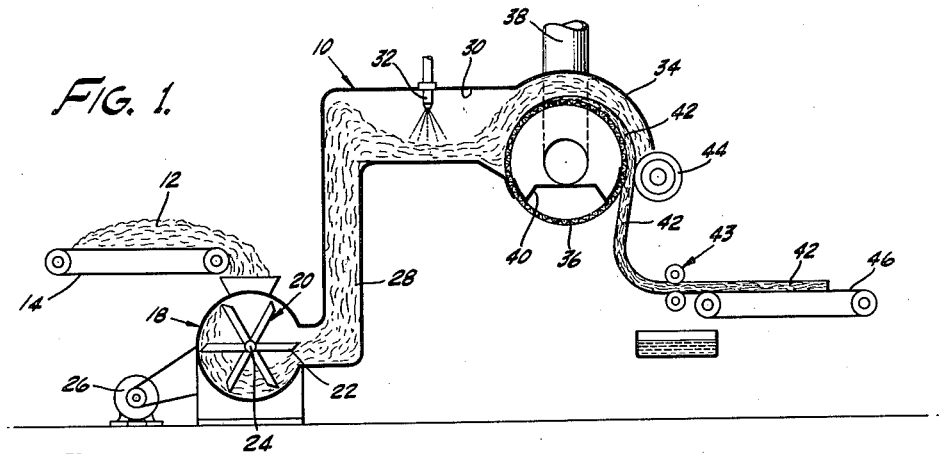
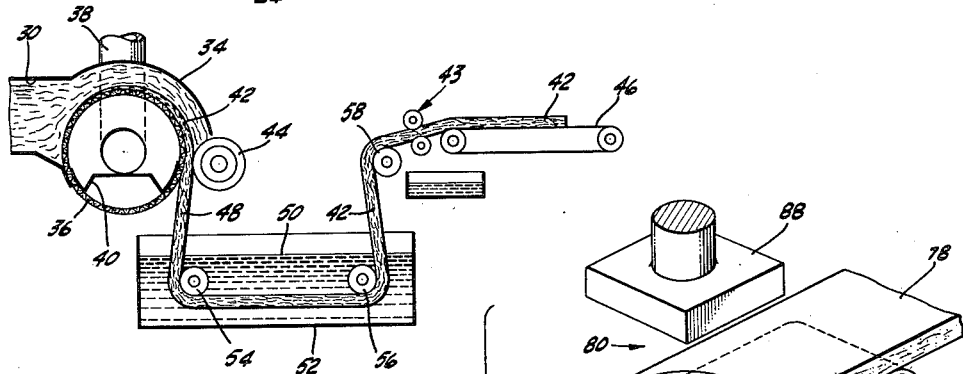
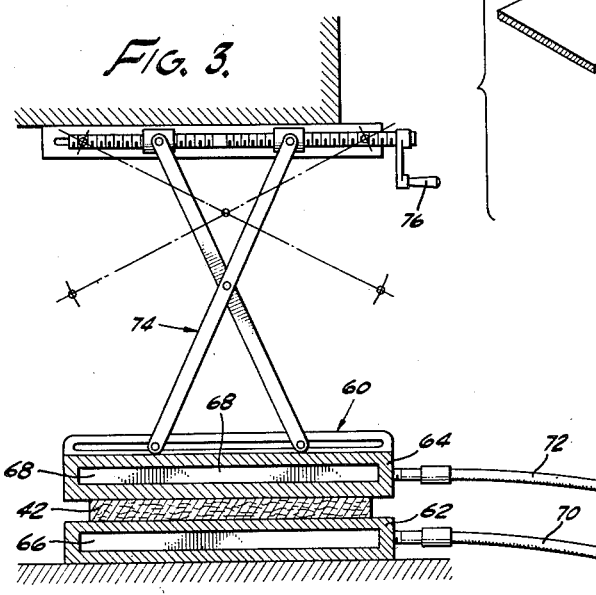
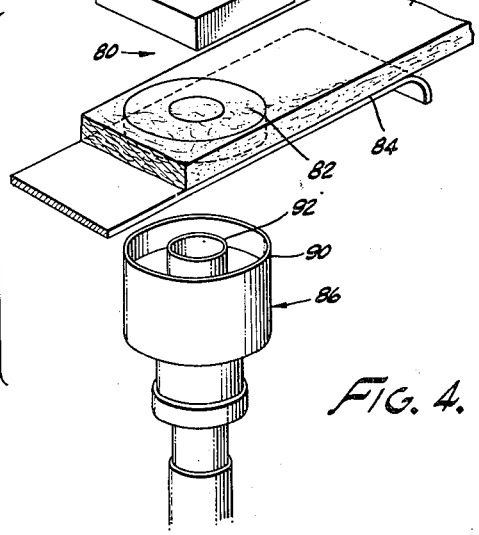
RALPH E. SCHWARTZ
INVENTOR.
BY
ATTORNEY Nov. 6, 1956 R. E. SCHWARTZ 2,769,741
METHOD OF MAKING A FIBROUS ARTICLE
Filed Jan. 19, 1953 2 Sheets-Sheet 2
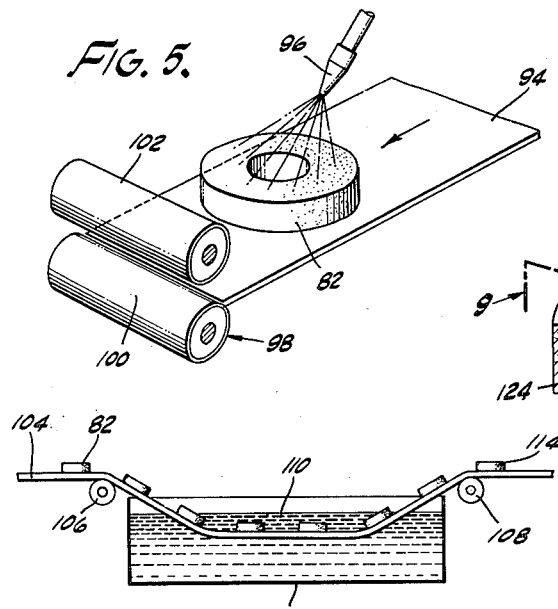
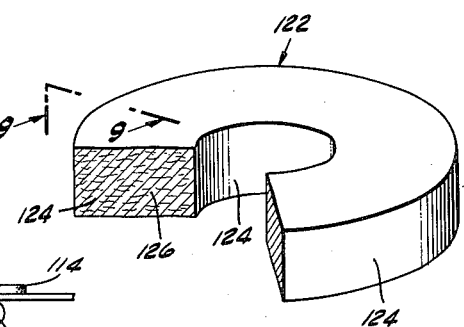
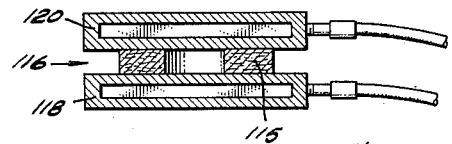
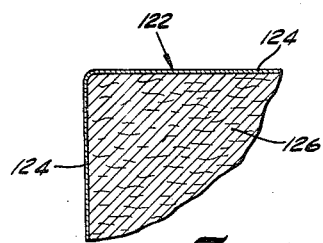
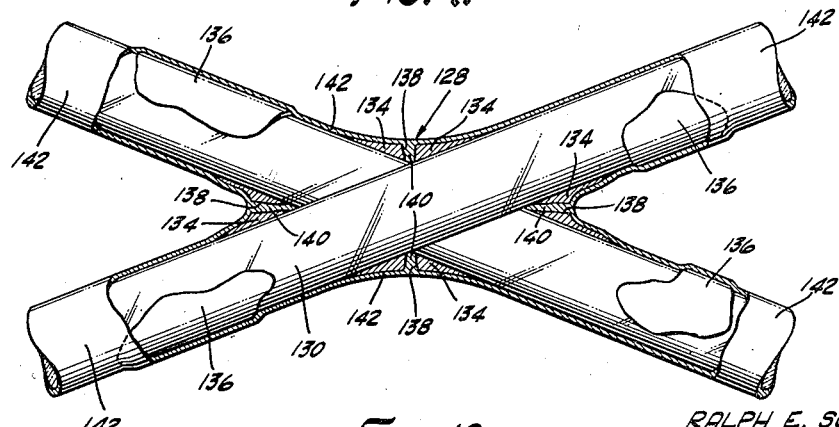

United States Patent Office 2,769,741
Patented Nov. 6, 1956

2,769,741

METHOD OF MAKING A FIBROUS ARTICLE

Ralph E. Schwartz, Sunland, Calif., assignor to The Malloran Corporation, Los Angeles, Calif., a corporation of California Application January 19, 1953, Serial No. 331,778

4 Claims. (Cl. 154—101)

My invention relates to fibrous mats, and more particularly to a unique method of making articles of manufacture from fibrous mats.

In prior art methods of making fibrous articles for vibration damping and other similar purposes, the usual procedure was to produce completed fibrous vibration damping mats, and then to cut the vibration damping articles out of these completed mats. One disadvantage in this prior art method of producing vibration damping articles of manufacture was that a considerable portion of the completed mats had to be discarded after the vibration damping articles were cut therefrom, so that there was a large wastage of materials.

Another disadvantange of the above prior art method of producing vibration damping articles was that most of these articles were cut from fibrous mats in which the fibers were bound together by a resin binder material. Although the resin caused the mats from which the articles were cut to be sufficiently rigid to render the cutting operations fairly simple, after the articles were cut from the "resin board" mats, the cut edges of the vibration damping articles contained exposed fibers and relatively brittle resin. These cut edges therefore became easily frayed or crumbled. If the articles were cut from the usual glass fiber type of resin board in which the fibers form in a generally laminar structure, these frayed edges often permitted whole flat sections of the vibration damping article to be pulled apart from the rest of the article.

In view of the above and other difficulties encountered in prior art methods of making fibrous articles for vibration damping and other similar purposes, it is an object of my present invention to provide a method for producing fibrous articles in which a minimum amount of the strategic materials used is wasted.

Another object of my present invention is to provide a method for producing fibrous articles of manufacture from fibrous mats which causes the finished articles to have smooth, strong surfaces, even including the cut surfaces caused by cutting the articles from the said mats.

Another object of my present invention is to provide a method of making fibrous articles which contain both resin and elastomer in which the articles may be easily cut from fibrous mats without interference by the elastomer.

A further object of my present invention is to produce fibrous articles of manufacture which have unusually good vibration damping characteristics and which will suffer a minimum amount of fatigue during operation as vibration dampeners or for other similar purposes.

Other objects and advantages of my present invention will be apparent from the following description and claims, the novelty consisting in the features of construction, combination of parts, the unique relations of the members, the relative proportioning, disposition and operation thereof, and the novel method steps, all as is more completely outlined herein and as is particularly pointed out in the appended claims.

In the accompanying drawings, which form a part of my present application,

Figure 1 is a vertical section of my preferred mat forming apparatus.

Figure 2 is a partial vertical section of my alternative mat forming apparatus,

Figure 3 is a side elevation, partly in section, of my preferred apparatus for curing the resin in my mat, Figure 4 is a perspective view of my preferred mat cutting apparatus.

Figure 5 is a perspective view showing my preferred apparatus for applying elastomer to my articles and then wringing my articles.

Figure 6 is a vertical section showing my alternative apparatus for applying elastomer to my articles, Figure 7 is a vertical section showing my apparatus for setting the elastomer in my articles, Figure 8 is a perspective view, with a portion broken away, of one of my finished articles.

Figure 9 is a partial sectional view along the line 9—9 in Figure 8, and

Figure 10 is a greatly enlarged elevational view, with portions broken away, showing a fiber intersection in one of my completed articles.

The first step in my present process is to provide a "resin board." Although this resin board may be any conventional resin board which is readily obtainable in the fibrous mat industry, I prefer to produce the resin board by my preferred mat forming apparatus shown in Figure 1 or my alternative apparatus shown in Figure 2 of the drawings.

Referring to Figure 1 of the drawings, my preferred mat forming apparatus 10 is provided with a plurality of raw fibers 12 by means of a conveyor unit 14. The raw fibers 12 may be any type of fibers, and the individual fibers 12 may have any desired dimensions. Examples of some of the more common types of fibers which I prefer to use are glass fibers, wool fibers, cotton fibers, asbetos fibers, cellulose fibers, coconut shell fibers and metal fibers.

Conveyor unit 14 deposits the raw fibers 12 in the input opening 16 of a chopper or picker unit 18 which consists essentially of a cylindrical shell member 19 within which is rotatively mounted a rotary cutter 20. Rotary cutter 20 includes a plurality of spaced cutting teeth 22 which are integrally mounted on a central axle 24 that is rotated by a motor 26.

Teeth 22 are preferably helically arranged along the axle 24 so that, while teeth 22 are chopping or picking the fibers 12 to the correct dimensions and distribution, the teeth 22 will move fibers 12 from the end of cylindrical shell 19 which contains input opening 16 to the other end of cylindrical shell 19 which communicates with chopper or picker output tube 28.

Circulation of air through the system causes the chopped or picked fibers to pass upward through tube 28 into a spraying chamber 30 within which a solution containing resin binder material is sprayed on the fibers from a spray nozzle 32 which is operatively connected to a suitable reservoir (not shown).

The resin which I spray on the fibers in the solution applied through spray nozzle 32 may be any thermo-setting plastic. Examples of some of these thermo-setting plastics, to which my present invention is not limited, are phenols, urea formaldehydes, polyesters, polyethelenes, vinyls, silicones, and combinations of these and other thermo-setting plastics.

If it is desired, a wetting agent may be applied to the fibers in the solution that is sprayed through spray nozzle 32. The wetting agent causes the resin in the solution to flow along the individual fibers so that a more uniform distribution of resin will be present in my completed product. Wetting agents normally consist of more or less complicated chemical molecules composed of two conventional parts, one termed hydrophylic and the other termed hydrophobic. Although any wetting agent will produce the desired results, examples of some of the more common wetting agents are di octyl sodium sulfo-succinate, di hexyl sodium sulfo-succinate, di amyl sodium sulfo-succinate, di iso butyl sodium sulfo-succinate, and iso propyl naphthalene sodium sulfonate. The last-mentioned wetting agent has the advantages of not adversely affecting some resins and of operating well in the presence of acid.

My sprayed fibers are then conducted into a forming hood 34, which is a portion of a cylinder, in which the fibers are deposited on a cylindrical forming screen 36 which is rotatively mounted within forming hood 34.

The sprayed fibers are sucked down onto cylindrical forming screen 36 by the exhausting of air from the inside of cylindrical forming screen 36 out of an exhaust tube 38 which is operatively connected to a suitable exhaust blower (not shown). Air is prevented from entering cylindrical forming screen 36 from outside of forming hood 34 by means of a stationary blanking member 40 which is disposed inside of and adjacent to cylindrical forming screen 36. The air currents which conduct the fibers through the system in the above described manner are also produced by the exhausting of air through exhaust tube 38.

The sprayed fibers pile up on cylindrical forming screen 36 to form wet mat 42 which may be passed through a wringer unit 43, if it is desired, after wet mat 42 had been removed from cylindrical forming screen 36 and forming hood 34 by means of an extractor roller 44, which may be rotated by any suitable means. It is advantageous to wring mat 42 at this stage in order to control the amount of resin which is present in my completed articles, and hence to control the "K" or spring factor of my completed articles.

The wet mat 42 is moved into position for the next step in my process by means of a conveyor unit 46.

Referring now to Figure 2 of the drawings, I have there illustrated an alternative apparatus for producing my wet resin mat 43. The mat 48 which is formed on cylindrical forming screen 36 in forming hood 34 does not contain any resin solution, although it may contain a wetting agent which was applied in spraying chamber 30, if it is desired. The fibers in mat 48 may be held together in any conventional manner, such as by applying an adhesive thereto in chamber 30. Mat 48 is then directed through a bath 50 disposed in a bathing tank 52 by passing underneath a pair of spaced guide rollers 54 and 56 that are placed within bathing tank 52. Bath 50 contains a solution of my resin, and may also contain a wetting agent if it is desired, so that mat 48 will be come my wet resin mat 42.

Wet mat 42 is directed upward out of bath 50 over a guide roller 58 and then may be wrung by wringer unit 43, if it is desired, before it is disposed on conveyor unit 46.

The next step in my present invention is to cure the resin in my wet resin mat 42. The resin may be cured by any conventional method, such as by heat treating mat 42, or by dielectrically treating mat 42, and my completed articles of manufacture will have substantially the same characteristics for vibration damping and other similar purposes regardless of whether the resin in mat 42 is totally or only partially polymerized.

In Figure 3 of the drawings I have illustrated a convenient heating press 60 within which the resin in my mat 42 may be cured. Mat 42 is placed between a pair of spaced heating plates 62 and 64 which may be heated in any conventional manner, such as by passing steam into chambers 66 and 68 of the respective plates 62 and 64 through a pair of conduits 70 and 72, respectively.

Although lower plate 62 is stationary, upper plate 64 is movably mounted on a pair of tongs 74 which may be suitably adjusted by means of a crank 76 to move plate 64 into and out of operative engagement with mat 42.

If the resin in mat 42 is phenol formaldehyde, a typical heating cycle for mat 42, which will polymerize the resin in mat 42 to approximately seventy-five (75%) percent of total polymerization, is to heat mat 42 at a temperature of three hundred (300°) degrees Fahrenheit for a period of six (6) minutes, which transforms mat 42 into resin board 78.

The resulting product of my heat treatment in heating press 60 is resin board 78, illustrated in Figure 4 of the drawings. If it is desired, resin board 78 may be procured on the market instead of being produced in the above-described manner, without substantially altering the end products of my present invention.

Resin board 78 is a relatively rigid mat which may be easily cut to produce articles in the shapes of my completed articles of manufacture. By cutting the articles from resin board 78 before any elastomer has been applied to it, the elastic qualities of the elastomer will not be present to interfere with the cutting operations.

Another advantage in cutting the articles from resin board 78 before any elastomer has been applied to it, is that the portions of the resin board 78 which must be discarded after the articles are cut therefrom do not contain elastomer, so that a large quantity of my elastomer is thereby saved.

In Figure 4 of the drawings, I have shown my preferred cutting apparatus 80 for cutting my articles out of resin board 78. Although my cutting apparatus 80 illustrated in Figure 4 is adapted to cut my articles in the form of washers, it is to be understood that cutting apparatus 80 may be adapted to cut my articles in any desired shape from resin board 78.

My resin board 78 is periodically moved laterally along a guide plate 84 having a passage therethrough (not shown) which is slightly larger than my cutting member 86, that is mounted below guide plate 84 and which is adapted to periodically move upwardly through said passage in guide plate 84 to operatively engage the bottom of a cutting block 88 which is mounted above guide plate 84 (by suitable apparatus not shown), and which is adapted to move downwardly against mat 78 each time cutting member 86 moves upwardly in a cutting operation. A pair of concentric cutting edges 90 and 92 are provided on cutting member 86 in the embodiment illustrated so that the articles 82 which are cut from resin board 78 each time cutting member 86 operatively engages cutting block 88 will be shaped as washers.

Cutting member 86 and cutting block 88 continually reciprocate toward and away from each other to cut a washer 82 from resin board 78 at regular intervals. Each time a washer 82 is cut from resin board 78, the resin board is moved laterally along guide plate 84 sufficiently to present an uncut portion of resin board 78 to cutting member 86 for the next washer to be cut from, with the minimum of wastage.

Although I have illustrated in Figure 4 and have described a preferred apparatus 80 for cutting washers or other articles from resin board 78, it is to be understood that any other suitable cutting apparatus may be used without deviating from the spirit of my present invention.

The next step in my present invention is illustrated in Figure 5 of the drawings. I place my resin board washers 92 on a suitable conveyor unit 94 which moves resin board washers 92 under a spray nozzle 96 at a substantially constant speed. Spray nozzle 96 sprays a solution containing elastomer, and this solution may also contain a wetting agent if it is desired, on resin board washers 82 so as to thoroughly impregnate washers 82 with the solution of elastomer, or elastomer and a wetting agent as the case may be. Hereinafter I will refer to this solution as merely "elastomer solution" to include either elastomer alone or elastomer and a wetting agent.

Although any elastomer may be applied to resin board washers 82 through spray nozzle 96, examples of some of the more common elastomers are all thermoplastics, such as polystyrenes, vinylidene chloride-acrylo-nitrile, the copolymer of vinyl chloride, vinylidene chloride and the synthetic latices, some of which are styrene butadiene compositions. Examples of some elastomers other than thermo-plastics are the natural latexes, which are secretions obtained principally from rubber trees and are suspensions of hydrocarbons in an aqueous serum containing also small quantities of proteins, resinous materials, mineral salts and sugars.

After my resin board washers 82 have been impregnated with my elastomer solution in the above manner, I pass them through a wringer 98 consisting essentially of a pair of adjustably spaced rollers 100 and 102 which are normally spaced apart a distance which is substantially less than the thickness of washers 82.

My above wringing operation produces several important results. First, by wringing my washers 82 at a time when the fibers therein are wet with elastomer solution, most of the adjacent fibers which would otherwise break due to abrasion against one another during operational use of my completed articles as vibration dampeners or for other similar purposes are broken during my wringing operation, so that practically no further fiber breakages occur when my completed article is compressed during said operational use. Thus, my completed article has extremely good fatigue characteristics.

In addition to causing the above mentioned fiber breakages, which are caused by wringing washers 82 when they are wet with my elastomer solution, my above wringing operation also causes a large portion of the relatively brittle cured resin binder concentrations at fiber intersections, which would otherwise break during operational use of my completed product, to break or fracture. This further enhances the fatigue characteristics of my completed articles of manufacture.

A further advantage of performing my wringing operation on washers 82 when they are impregnated with elastomer solution is that the amount of elastomer present in my completed articles of manufacture may be controlled by my above wringing operation. Control over the amount of elastomer in my completed articles correspondingly controls the "R" or damping factor of my completed articles. By wringing my mat 42 shown in Figures 1 and 2, which is wet with resin solution in wringer 43, and then by wringing my washers 82, which are wet with elastomer solution in wringer 98, I am able to accurately predetermine both the "K" or spring factor and the "R" or damping factor of my completed articles. This permits me to correctly correlate the spring and damping factors of my completed articles so that they will have optimum vibration damping characteristics for any particular desired end use.

My above wringing operations also serve to cause a more even distribution of my resin and elastomer within my completed articles.

Illustrated in Figure 6 of the drawings is an alternative apparatus which I may use for impregnating my resin board washers 82 with elastomer solution. A suitable conveyor belt 104 to which resin board washers 82 are attached, by mere gravity, or otherwise, is suspended between a pair of spaced rollers 106 and 108 in such a manner that resin board washers 82 will be immersed in a bath 110 containing elastomer solution, and which may also contain a wetting agent if it is desired. Bath 110 is contained in a suitable bathing tank 112. After bathed washers 114 are removed from bath 110, they may be passed through a wringer similar to wringer 98, which is illustrated in Figure 5 of the drawings, thereby producing my wrung washers 115.

The next step in my present invention is to set the elastomer in my wrung washers 115. The elastomer may be set in washers 115 in any conventional manner, such as by heat treating washers 115 or by dielectrically treating washers 115. A convenient apparatus for setting the elastomer in wrung washers 115 is heating press 116 illustrated in Figure 7 of the drawings. The wrung washers are disposed between lower and upper heating plates 118 and 120 of heating press 116 and plates 118 and 120 are heated in any conventional manner through conduits 119 and 121 to apply the desired heating cycle to wrung washers 115.

The heating cycle which is applied to wrung washers 115 in heating press 116 applies sufficient heat to washers 115 to drive off enough of the moisture from the elastomer to satisfactorily set the elastomer. If the elastomer which is impregnated in wrung washers 115 is a styrene compound, a typical heating cycle is to heat wrung washers 115 at a temperature of two hundred (200°) degrees Fahrenheit for a period of six (6) minutes.

Sufficient heat will be radiated from heating plates 118 and 120 to satisfactorily set the elastomer on the cut edges of wrung washers 115, thereby transforming them into my completed articles 122. However, if it is desired, heat may be directly applied to these cut edges by any conventional means (not shown).

Referring now to Figure 8 of the drawings, the resulting product of my heat treatment in heating press 116 is my completed article of manufacture 122, which, for convenience, has been shown as a vibration damping washer.

By applying my elastomer solution to the resin board washers 82 after washers 82 had been cut from the resin board 78, the cut edges as well as the other surfaces of my completed article of manufacture 122 have a thin surface "skin" 124 thereon in the manner best illustrated in Figure 9 of the drawings. Thus, instead of having the relatively brittle binder material and cut fibers exposed at the cut edges 125 of the completed article, these edges 125 are as smooth and firm as the top surfaces 127 and then are also elastic due to the nature of the elastomer. This "skin" 124 prevents fraying and crumbling at the edges 125 of my completed article 122 and thereby greatly increases the durability of my article 122. This "skin" 124 also prevents layers from being peeled off of my completed article as at 125, if the article has been formed with glass fibers in such a manner that the fibers are disposed in layers.

The internal portion 126 of my completed article will, of course, consist of fibers which are bound together by a combination of my resin and elastomer binder materials. In order to best describe the typical fiber and binder structure which is to be found in the internal portion 126 of my completed articles 122, I have illustrated a fiber intersection 128 between two adjacent fibers 130 and 132 in the internal portion 126 of my completed article 122, in Figure 10 of the drawings.

When my wet mat 42 is heat treated to cure the resin therein, the heating cycle, combined with the wetting agent if the wetting agent is present, causes a substantial portion of the resin in the mat to flow to fiber intersections 128 and to remain at intersections 128 in the form of resin concentrations 134, a number of which become relatively brittle when the resin curing operation is completed. The remainder of the resin will be distributed along the individual fibers 130 and 132 in the form of resin smears 136, or, if sufficient resin is applied, the remainder of the resin will form along fibers 130 and 132 in the form of solid resin coatings.

When my resin board washers are impregnated with elastomer solution and wrung, the above wringing operation at wringer 98 causes a substantial portion of the relatively brittle resin concentrations 134 at fiber intersections 128 to fracture as at 138 in Figure 10. The high fluidity of the elastomer during the heat treatment of wrung washers 115 to set the elastomer causes the elastomer to flow into fractures 138 and to thereby form elastomer fills 140 in fractures 138. The remainder of the elastomer will spread out along the individual fibers 130 and 132 and over the outer surfaces of resin concentrations 134 in the form of elastomer coatings 142. If insufficient elastomer is present, the remainder of the elastomer will be spread out along the individual fibers as elastomer smears instead of as coatings 142.

When the elastomer is set, the elastomer fills 140 knit fractures 138 together with a flexible, elastic material which permits a considerable amount of flexing between the individual fibers 130 and 132 without causing any additional fractures or breakages. The elastomer which is spread out along the individual fibers 130 and 132 of course tends to prevent abrasion between bare fibers and consequent fiber breakages.

My completed articles of manufacture 122 thus have extremely good fatigue characteristics, both due to the presence of elastomer fills 140 and elastomer coatings 142, and due to the results of my hereinabove described wringing operations.

The presence of the elastomer in my completed articles 122 gives the articles a good damping factor, which may be controlled by my wringing operation in wringer 98 (Figure 5). Similarly, the presence of the resin in my completed articles 122 gives the articles a good "K" or spring factor, which may be controlled by my wringing operation in wringer 43 (Figures 1 and 2).

By forming my resin board washers 82 in the shape of my completed articles 122 before applying any elastomer to my fibers, my present method for producing completed articles 122 requires a considerably smaller amount of elastomer than would be required if articles 122 were cut from completed mats containing both resin and elastomer.

It is to be understood that the form of my invention herein shown and described is my preferred embodiment and that various changes in the shape, size, arrangement of parts and operative steps may be resorted to without departing from the spirit of my invention, or the scope of the appended claims.

I claim:
1. The method of making a fibrous article of manufacture which includes the steps of cutting said article out of cured, fibrous resin board, fracturing some of the cured resin concentrations at fiber intersections in said article, introducing elastomer into some of said fractures and setting said elastomer.

2. The method of making an article of manufacture which includes the steps of cutting said article out of resin board, impregnating said article with elastomer solution, squeezing said article when the article is wet with elastomer solution to break some of the cured resin concentrations at fiber intersections in said wet article, and setting the elastomer then remaining in said article.

3. The method of making an article of manufacture which includes the steps of applying a controlled amount of resin solution to a plurality of fibers to form a wet, fibrous resin mat, squeezing a controlled amount of said resin solution out of said wet resin mat, curing said resin then remaining in said wet resin mat, cutting said article out of said cured resin mat, applying a controlled amount of elastomer solution to said cut article, squeezing a controlled amount of said elastomer solution out of said wet article, and setting the elastomer then remaining in said wet article.

4. The method of making an article of manufacture which includes the steps of cutting said article out of resin board, applying a controlled amount of elastomer solution to said article, squeezing a controlled amount of said elastomer solution out of said article, fracturing some of the cured resin concentrations at fiber intersections in said wet article, introducing elastomer solution into some of said fractures, and setting the elastomer then remaining in said article, including said introduced elastomer then remaining in said fractures.

References Cited in the file of this patent

UNITED STATES PATENTS

| | | |
|---|---|---|
| 2,087,441 | Metcalf et al. | July 20, 1937 |
| 2,249,888 | Dodge | July 22, 1941 |
| 2,255,504 | Current | Sept. 9, 1941 |
| 2,550,465 | Gorski | Apr. 24, 1951 |
| 2,600,843 | Bush | June 17, 1952 |